(12) United States Patent
Oyman et al.

(10) Patent No.: US 8,885,745 B2
(45) Date of Patent: *Nov. 11, 2014

(54) DISTORTION-AWARE MULTIPLE INPUT MULTIPLE OUTPUT COMMUNICATIONS

(75) Inventors: Ozgur Oyman, San Jose, CA (US); Jeffrey R. Foerster, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 877 days.

This patent is subject to a terminal disclaimer.

(21) Appl. No.: 12/655,091

(22) Filed: Dec. 23, 2009

(65) Prior Publication Data

US 2011/0150111 A1 Jun. 23, 2011

(51) Int. Cl.
- *H04B 7/02* (2006.01)
- *H04L 1/06* (2006.01)
- *H04L 25/03* (2006.01)
- *H04L 1/00* (2006.01)

(52) U.S. Cl.
CPC ......... *H04L 25/03343* (2013.01); *H04L 1/0026* (2013.01); *H04L 1/0618* (2013.01); *H04L 2025/03426* (2013.01); *H04L 1/0003* (2013.01); *H04L 1/0009* (2013.01); *H04L 1/0019* (2013.01)
USPC ............................ 375/267; 375/285; 375/296

(58) Field of Classification Search
CPC .. H04B 7/0413; H04B 7/0456; H04L 1/0009; H04L 1/0618; H04L 25/03343; H04L 2025/03426
USPC ......................................... 375/267, 285, 296
See application file for complete search history.

(56) References Cited

U.S. PATENT DOCUMENTS

| | | | |
|---|---|---|---|
| 8,553,796 B2 | 10/2013 | Oyman et al. | |
| 2003/0165189 A1* | 9/2003 | Kadous | 375/225 |
| 2005/0002468 A1 | 1/2005 | Walton et al. | |
| 2005/0063314 A1* | 3/2005 | Sahinoglu et al. | 370/252 |
| 2006/0176972 A1* | 8/2006 | Kim et al. | 375/267 |
| 2007/0206695 A1 | 9/2007 | Ye et al. | |
| 2007/0217538 A1* | 9/2007 | Waxman | 375/267 |
| 2008/0080632 A1* | 4/2008 | Kim et al. | 375/267 |
| 2008/0101494 A1 | 5/2008 | Kotecha et al. | |
| 2008/0159203 A1* | 7/2008 | Choi et al. | 370/328 |
| 2010/0075703 A1 | 3/2010 | Imai et al. | |
| 2010/0104025 A1* | 4/2010 | Rose et al. | 375/240.27 |
| 2014/0010322 A1 | 1/2014 | Oyman et al. | |

FOREIGN PATENT DOCUMENTS

| | | |
|---|---|---|
| CN | 1829136 A | 9/2006 |
| JP | 2007-151056 A | 6/2007 |
| KR | 10-2006-0043799 A | 5/2006 |
| KR | 10-2009-0101773 A | 9/2009 |

(Continued)

OTHER PUBLICATIONS

International Search report and Written Opinion received for International Patent Application No. PCT/US2010/058799, mailed on Aug. 26, 2011, 9 pages.

(Continued)

*Primary Examiner* — Shuwang Liu
*Assistant Examiner* — David S Huang
(74) *Attorney, Agent, or Firm* — Forefront IP Lawgroup, PLLC

(57) ABSTRACT

Parameters for encoding of a source are selected to minimize distortion between the source and a reconstructed source induced by transmission of the source over a multiple input multiple output (MIMO) channel.

15 Claims, 9 Drawing Sheets

(56) References Cited

FOREIGN PATENT DOCUMENTS

| WO | 2008/138165 | A1 | 11/2008 |
|---|---|---|---|
| WO | 2009/100567 | A1 | 8/2009 |
| WO | 2011/087614 | A2 | 7/2011 |
| WO | 2011/087614 | A3 | 11/2011 |

OTHER PUBLICATIONS

International Preliminary Report on Patentability and Written Opinion received for PCT Patent Application No. PCT/US2010/058799, mailed on Jul. 5, 2012, 6 pages.

Office Action received for Japanese Patent Application No. 2012-545989, mailed on Dec. 10, 2013, 3 page of English Translation and 3 pages of Office Action.

Kim et al., "Energy-Aware Link Adaptation for MIMO-OFDM Based Wireless Communication", Wireless Integrated Systems Research (WISR) Group, University of California, Nov. 16-19, 2008, 8 pages.

Mirkovic et al., "On Performance of MIMO Link Adaptation in the Presence of Channel Uncertainty", ComNets, Faculty 6, RWTH Aachen University, Oct. 12-14, 2008, pp. 84-89.

Morinaga et al., "A Study of MIMO/AMS Employed Transmit Power Control", Proceedings of the IEICE general conference 2003, Mar. 3, 2003, pp. 621.

Tran et al., "A Novel Adaptive Beamforming for Space-Time Block Codes", Department of Electronic Engineering, The University of Electro-Communications, 2003, 7 pages.

Samsung, "Multiplexing Control and Data in the PUSCH", Discussion and Decision, 3GPP TSG RAN WG1 #52bis, R1-081223, Mar. 31-Apr. 4, 2008, 4 pages.

Texas Instruments, "Coding of Control Information on PUSCH", 3GPP TSG RAN WG1 53, R1-081989, May 5-9, 2008, 4 pages.

Office Action received for Chinese Patent Application No. 201010620762.3, mailed on Apr. 3, 2013, 19 pages of English Translation Only.

Oyman et al., "Distortion-Aware MIMO Link Adaptation for Enhanced Multimedia Communications", Intel Corporation, Wireless Communications Lab, Sep. 26-30, 2010, pp. 387-392.

Non-Final Office Action received for U.S. Appl. No. 12/800,265, mailed on Aug. 16, 2012, 15 pages.

Notice of Allowance received for U.S. Appl. No. 12/800,265, mailed on Apr. 1, 2013, 10 pages.

Notice of Allowance received for U.S. Appl. No. 12/800,265, mailed on Jun. 6, 2013, 8 pages.

Non-Final Office Action received for U.S. Appl. No. 14/021,194, mailed on Dec. 3, 2013, 11 pages.

Office Action received for Chinese Patent Application No. 201010620762.3, mailed on Jan. 3, 2014, 28 pages of English Translation and 17 pages of Chinese Office Action.

Office Action received for U.S. Patent Appl. No. 14/021,194, mailed on Aug. 19, 2014, 9 pages.

Office Action Received for Japanese Patent Application No. 2012-545989, mailed on Jun. 10, 2014, 6 pages of Office Action including 3 pages of English Translation.

* cited by examiner

DISTORTION-AWARE MULTIPLE INPUT MULTIPLE OUTPUT COMMUNICATIONS

BACKGROUND

Wireless communication technology has evolved from a technology offering mainly voice service to a technology that also provides multimedia content. Recent advances in mobile computing and wireless communications enable transmission of rich multimedia content over wireless networks. One such advance is the use of MIMO (Multiple Input Multiple Output) communications in which multiple antennas are used at both the transmitter and the receiver for increasing data throughput without requiring additional bandwidth. Further, while MIMO configurations are usually optimized to maximize data transmission rates, with the increased demand for various different services at the application layer, achieving high reliability in addition to high data transmission rates at the physical layer (PHY) has become ever more important. However, high data rates and high reliability tend to be conflicting design parameters.

Typical wireless communications involve the transmission of a continuous source over a noisy channel. Common examples are speech communications, multimedia communications, mobile TV, mobile video and broadcast streaming. In such communications, the source is encoded and compressed into a finite stream of bits, and the bit stream is then communicated over the noisy channel. Source coding is carried out to convert the continuous source into a finite stream of bits, and channel coding is performed to mitigate the errors in the bit stream introduced by the noisy channel. At the receiver end, a channel decoder recovers the bit stream from its noisy version, and a source decoder reconstructs the multimedia source from the recovered compressed version. During transmission of a multimedia communication, minimizing distortion between the original multimedia source and the reconstructed version at the receiver can provide a better multimedia experience for a user.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

DETAILED DESCRIPTION

Distortion-Aware Link Adaptation

Some implementations herein provide a distortion-aware MIMO (Multiple Input Multiple Output) communication system that minimizes end-to-end distortion of transmissions. For example, some implementations provide for MIMO link adaptation for enhancing multimedia communications, and optimizing end-to-end robustness of multimedia content delivery in order to afford a superior user experience. Consequently, some implementations provide for adaptive modulation and coding (AMC), MIMO space-time modulation, rate/power adaptation, precoding and antenna selection techniques subject to one or more end-to-end distortion minimization criteria.

Figure 1:
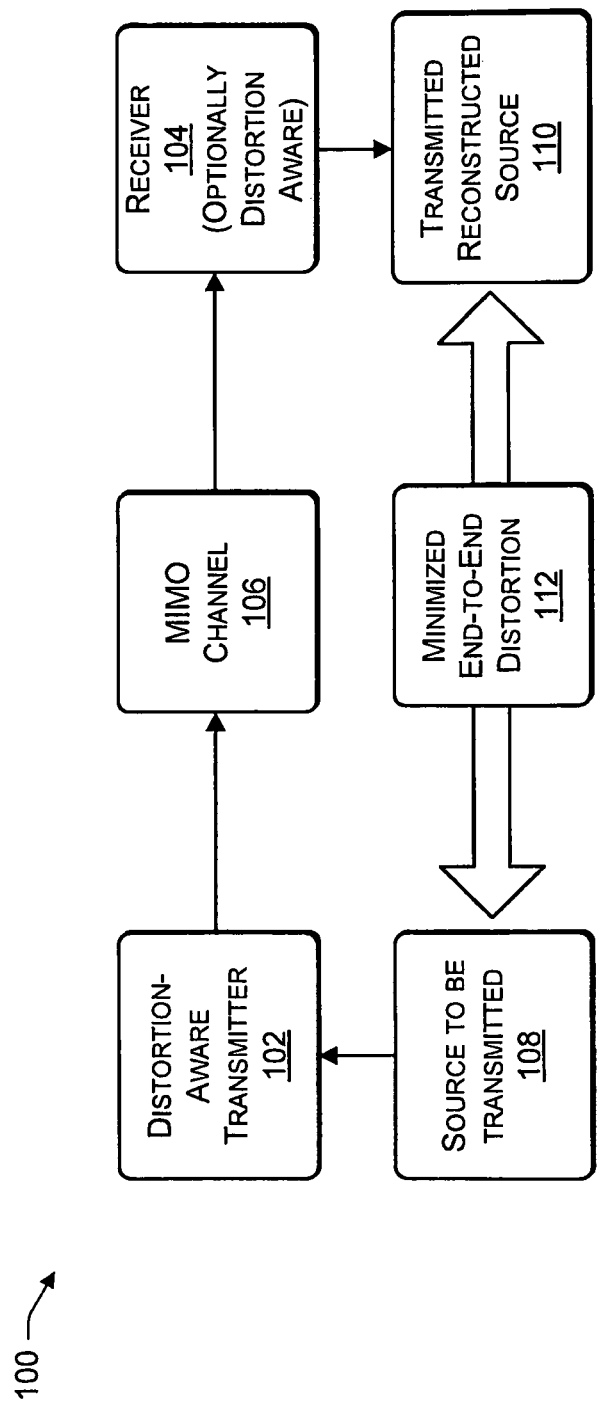
FIG. 1 illustrates an exemplary block diagram of a distortion-aware communication system according to some implementations disclosed herein.

FIG. 1 illustrates an exemplary block diagram of a communication system 100 according to some implementations herein. System 100 includes a distortion-aware transmitter 102 able to communicate with a receiver 104 through a MIMO channel 106. The distortion-aware transmitter 102 is configured to receive a source to be transmitted 108. Transmitter 102 takes into account distortion minimizing link adaptation parameters during channel encoding, and transmits the source over the MIMO channel to the receiver 104. The receiver 104 is configured to receive the MIMO transmission and reconstruct the transmission to generate a transmitted reconstructed source 110. Because the distortion-aware transmitter 102 takes distortion minimizing parameters into consideration during the encoding stage, the system is able to achieve minimized end-to-end distortion 112 between the source to be transmitted 108 and the transmitted reconstructed source 110, thereby providing improved communications for transmitting multimedia items and the like. Optionally, the receiver 104 may also be distortion-aware and provide feedback to the transmitter 102 for enabling the transmitter 102 to be distortion aware. For example, the receiver 104 may determine link adaptation parameters to minimize end-to-end distortion and provide these parameters as feedback to the transmitter 102, which then uses the provided parameters. In this optional setting, transmitter 102 may also send the rate-distortion characteristics of the source to receiver 104, so that the distortion-aware receiver 102 can utilize this information in determining the link adaptation parameters to achieve the minimized end-to-end distortion 112.

Figure 2:
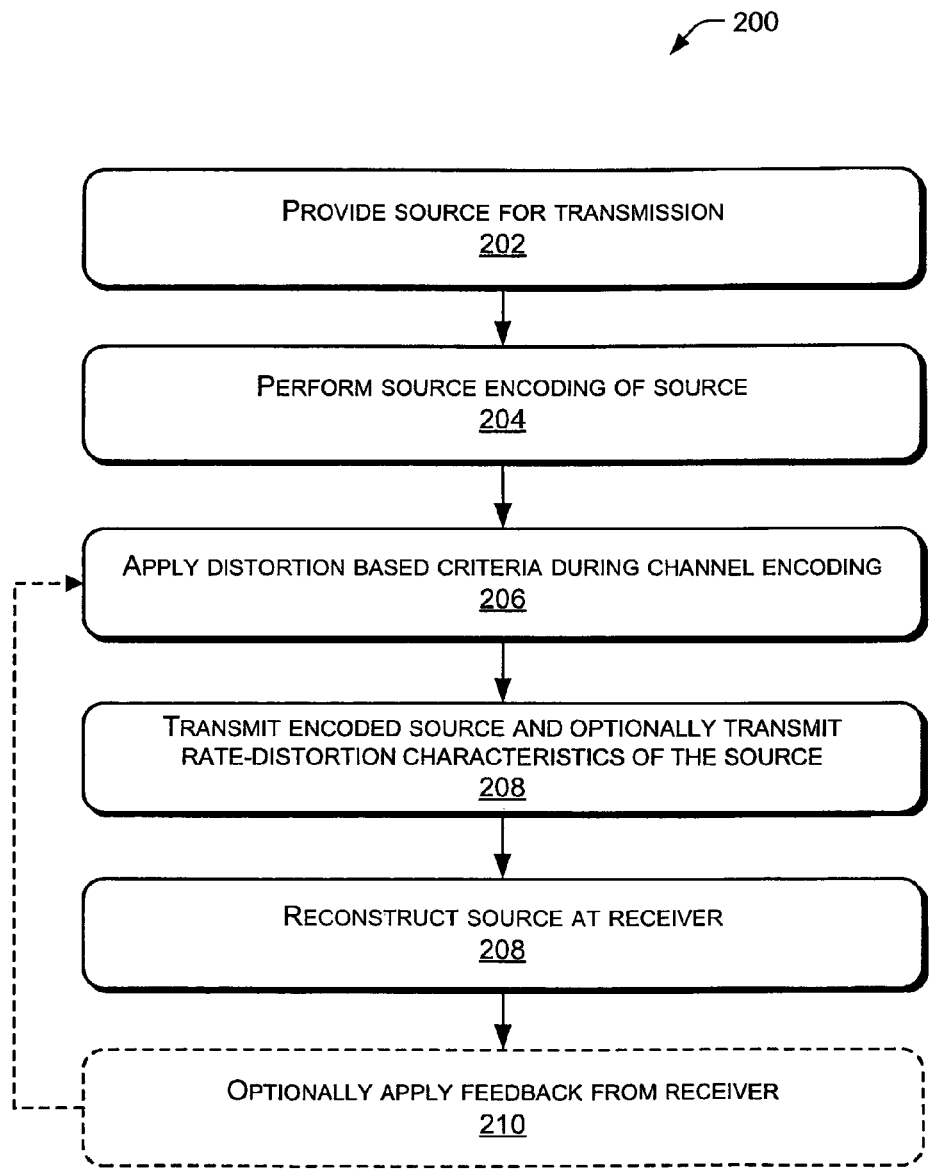
FIG. 2 illustrates a flow diagram of an exemplary process for distortion-aware communications according to some implementations.

FIG. 2 illustrates a flow diagram of an exemplary process 200 corresponding to the implementation of FIG. 1. In the flow diagram, the operations are summarized in individual blocks. The operations may be performed in hardware, or as processor-executable instructions (software or firmware) that may be executed by a processor.

At block 202, a source is provided to a transmitter for transmission. For example, the source may be a continuous or finite source, such as a multimedia communication, such as voice over IP, speech and audio communications, mobile TV, mobile video services, or the like. Implementations herein may apply to multimedia communications over wireless local area networks (WLANs), wireless personal area networks (WPANs), wireless wide area networks (WWANs) and wireless metropolitan area networks (WMANs). Moreover, implementations may include cellular networks, mobile broadband networks, satellite broadcasting systems and terrestrial broadcasting systems. For example, implementations can be used in 802.11-based LANs, 802.15-based PANs and 802.16-based WANs where MIMO technologies have been adopted and it is desirable to reliably communicate multimedia content (e.g., the IEEE 802.11 standard, IEEE std., 802.11-2009, published Oct. 29, 2009, or future implementations thereof; the IEEE 802.15 standard, IEEE std., 802.15-2006, published September 2006, or future implementations thereof; and the IEEE 802.16 standard, IEEE std., 802.16-2009, published 2009, or future implementations thereof). Implementations can also be used for MIMO in 3G networks, 4G networks, cellular networks, WWANs, 3GPP networks, LTE networks, LTE-Advanced networks, and Mobile TV, and the like. Further, while several specific standards have been set forth herein as examples of suitable applications, implementations herein are not limited to any particular standard or protocol.

At block 204, source coding is carried out by the transmitter to convert the continuous source into a finite stream of bits.

At block 206, channel encoding is carried out by the transmitter to mitigate the errors in the bit stream that will be induced by the channel, while incorporating distortion-minimizing parameters during the encoding.

At block 208, the encoded source is transmitted to the receiver over the MIMO channel. Along with the encoded source, the rate-distortion characteristics of the source may optionally be transmitted over the MIMO channel, so that this information may be used by the receiver toward distortion-aware link adaptation.

At block 210, the receiver receives the transmission from the transmitter and decodes the transmission to reconstruct the source.

At block 212, optionally, the receiver can provide feedback to the transmitter to provide the transmitter with the distortion-minimizing parameters. When the transmitter receives the feedback, the newly received distortion minimizing parameters can be applied to the channel encoding.

Source and Channel Coding

As source and channel coding operations are performed at different communication layers, many conventional communication systems implement the source coding entirely separately from the channel coding That is, source coding may be performed without taking into account the channel behavior and channel coding may be performed without considering the nature of the source. In general, multimedia wireless communication involves transmitting analog sources over fading channels while satisfying end-to-end distortion and delay requirements of the application. For example, delay-limitedness accounts for the presence of stringent latency and buffer constraints. Accordingly, separation of source and channel coding may not be optimal, such as when the channel state information (CSI) is not available at the transmitters or when finite coding blocklengths are used due to practical system limitations.

Some implementations herein adopt a joint source-channel coding technique for providing MIMO link adaptation. In the joint source-channel coding according to implementations herein, the source compression and channel coding are performed together, such that the end-to-end distortion for wireless multimedia communication can be minimized by accounting for the impact of both quantization errors (due to lossy compression) and channel-induced errors (due to fading and noise).

MIMO Communications

Furthermore, a major performance-enhancing technology in today's wireless networks is multiple-input multiple-output (MIMO) wireless communication, which uses multiple antennas at both ends of a point-to-point wireless link. The use of MIMO systems can improve spectral efficiency, link reliability and power efficiency through spatial multiplexing gain, diversity gain and array gain, respectively.

Two practical techniques for space-time modulation in MIMO systems are transmit diversity and spatial multiplexing. MIMO diversity refers to a family of techniques (e.g., space-time coding (STC)) that attempt to spread information across transmit antennas to enable robust transmission and substantial reliability and coverage improvement in the presence of fading. Spatial multiplexing (SM), on the other hand, refers to a form of spatial modulation that achieves high data rates by dividing the incoming data into multiple substreams and transmitting each substream on a different antenna, enabling transmission rate growth dependent, at least in part, upon the number of transmit and receive antennas. A receiver removes the mixing effect of the channel and demultiplexes the symbol stream. A MIMO system can benefit from both MIMO diversity and MIMO SM. As a general rule, at low signal-to-noise ratios (SNRs), it is preferable to use MIMO diversity techniques and at high SNRs it is preferable to use MIMO SM. Adaptive switching between MIMO diversity and MIMO SM based on the knowledge of the long-term and/or short-term channel fluctuations at the transmitter extracts the highest possible gains from MIMO techniques in terms of spectral efficiency and reliability. Apart from adaptive switching between MIMO diversity and MIMO spatial multiplexing, MIMO link adaptation techniques also include MIMO precoding and MIMO antenna selection.

Distortion-Aware MIMO Link Adaptation

The inventors herein have determined that there is a tradeoff between resolution at the source encoder and robustness at the channel encoder. Accordingly, limiting source distortion and associated quantization errors uses a high-rate source code, for which the multiple antennas of the MIMO channel are used mainly for multiplexing. Alternatively, the source can be encoded at a lower rate with more distortion, and then the channel error probability and associated packet error rate (PER) can be reduced through increased diversity. Consequently, some distortion-aware MIMO link adaptation implementations provided herein take this tradeoff into consideration toward optimizing end-to-end multimedia communications over MIMO wireless networks.

For example, in an implementation of a point-to-point single-user MIMO communication system with a number of $M_t$ transmit antennas and a number $M_r$ receive antennas over a coding blocklength T, the $M_r \times T$ received signal vector is given by the following formula:

$$y = HQs + n$$

where H is the $M_r \times M_t$ complex random channel matrix representing the MIMO link (which remains fixed over the entire coding blocklength T), s is the $M \times T$ transmitted space-time block codeword, Q is the $M_t \times M$ linear precoding matrix ($M \leq M_t$ is a precoding design parameter) such that trace $(Q^*Q') = 1$ (where Q' is the Hermitian of Q) and n is the $M_r \times T$ additive white Gaussian noise (AWGN) noise vector where each entry has zero mean and variance $\sigma^2$. The average received signal-to-noise ratio (SNR) for the MIMO link is given by $SNR = E[|s|^2]/\sigma^2$.

The space-time block codeword s incorporates MIMO link adaptation and the associated selection of the MIMO modulation-and-coding schemes (MIMO-MCS), which includes (a) selection of the modulation order, (b) selection of the forward error correction (FEC) type and coding rate, and (c) determination of which space-time modulation techniques will be used. Options include spatial multiplexing (SM), space-time coding (STC), orthogonal space-time block coding (OSTBC), and the like.

Furthermore, the selection of the precoding matrix Q, includes (a) beamforming to convert a MIMO channel into an equivalent single-input single-output (SISO) channel, (b) precoded spatial multiplexing, (c) precoded OSTBC, (d) transmit power allocation and covariance optimization, and (e) transmit antenna selection techniques where M out of $M_t$ transmit antennas are selected for transmission.

In the presence of dynamic channel variations due to fading, along with the uncertainty on the actual channel state information (CSI) at the transmitter (due to reasons such as high mobility, noise on the feedback channel and availability of a limited number of CSI feedback bits), there is uncertainty on the achievable rates at the transmitter, and hence, the packet transmitted may be corrupted, leading to packet errors if the transmitted rate exceeds the instantaneous channel capacity determined by the channel realization H. Moreover, AWGN noise also may cause packet errors despite the use of powerful channel coding. Thus, according to some implementations herein, transmissions over the MIMO channel may be associated with a packet error rate (PER), which is impacted by the average received SNR, instantaneous channel realization H, MIMO-MCS scheme and precoding matrix Q.

Typically, MIMO link adaptation aims to maximize the link throughput, goodput or spectral efficiency, which is achieved when the selected MIMO MCS transmission mode provides the highest spectral efficiency based on the channel conditions. For example, given channel state information, it is possible to predict the packet error rate of all available MIMO MCS modes and choose the MIMO MCS mode which offers the highest spectral efficiency. Therefore, MIMO link adaptation typically aims to maximize goodput (also known as throughput) given by the following formula:

$$goodput = \tilde{R} * (1 - PER)$$

such that $$(MIMO\_MCS, Q) = \arg\max_{MIMO\_MCS, Q} \tilde{R} * (1 - PER),$$

where $\tilde{R}$ is the space-time transmission rate at the channel coder determined by the selected MIMO-MCS scheme (including FEC type and code rate, modulation order, MIMO space-time modulation scheme) and PER is the packet error rate (PER) determined by the average received SNR, channel realization H, MIMO MCS and precoding matrix Q.

Instead of attempting to maximize goodput, implementations herein provide a MIMO link adaptation technique for minimizing an expected value of end-to-end distortion by choosing the MIMO MCS and precoding matrix Q using the following distortion-based criterion:

$$(MIMO\_MCS_{SELECTED}, Q_{SELECTED}) =$$

$$\arg\min_{MIMO\_MCS, Q} D_{ave}(MIMO\_MCS, Q)$$

where $D_{ave}$(MIMO_MCS, Q) represents the average end-to-end distortion for a given MIMO MCS and precoding matrix Q. In other words, the selection of MIMO MCS, precoding matrix Q and MIMO space-time modulation mode (e.g., MIMO diversity or MIMO SM) for the multimedia transmission is decided according to implementations herein so that the resulting end-to-end distortion $D_{ave}$(MIMO_MCS, Q) is minimized.

For the MIMO diversity mode (e.g., MIMO STC, MIMO OTSBC, etc.) as well as single-input single-output (SISO) systems, the average end-to-end distortion at data rate R is given by formula (1), as follows:

$$D_{ave}(MIMO\_MCS\_DIV, Q) = D(b*R)*(1-PER) + D_{max}*PER \quad (1)$$

For the MIMO SM mode with vertical encoding, where a total of N spatial streams are sent simultaneously over the MIMO link using a single space-time-frequency encoder for all N spatial streams, with each spatial stream sent at data rate R, the average end-to-end distortion is given by formula (2), as follows:

$$D_{ave}(MIMO\_MCS\_SM, Q) = D(N*b*R)*(1-PER) + D_{max}*PER \quad (2)$$

In the case of a MIMO vertical encoding architecture with a linear receiver (e.g., zero-forcing (ZF) or minimum mean square-error (MMSE) receiver) followed by a single space-time-frequency decoder, the packet error rate (PER) is dictated by the quantity $SINR_{min} = \min_n SINR_n$, such that $SINR_n$ is the signal-to-interference-and-noise ratio (SINR) corresponding to the n-th multiplexed MIMO spatial stream (n=1, . . . , N).

For the MIMO SM mode with horizontal encoding, where a total of N spatial streams are sent simultaneously over the MIMO link using a separate time-frequency encoder that is associated with each of the N spatial streams, with each spatial stream sent at data rate R, the average end-to-end distortion is given by formula (3), as follows:

$$D_{ave}(MIMO\_MCS\_SM, Q) = \sum_{n=0}^{N} D(n*b*R)\left(\sum_{K_n} \prod_{k:b_k=1}(1-PER_k)\prod_{l:b_l=0} PER_l\right) \quad (3)$$

where $PER_n$ is the packet error rate for the n-th multiplexed MIMO spatial stream (n=1, . . . , N), and for $\{b_n \in \{0,1\}\}_{n=1}^{N}$, then $$K_n = \left\{(b_1, \ldots, b_N) : \sum_{k=1}^{N} b_k = n\right\},$$

after observing that, for the MIMO horizontal encoding architecture, each of the N spatial streams is encoded and decoded independently. For the MIMO SM mode where two spatial streams are sent simultaneously over the MIMO link using horizontal encoding, the average end-to-end distortion is given by re-writing equation (3) for N=2, as follows:

$$D_{ave} = D(2bR)*(1-PER_1)(1-PER_2) + D(bR)[PER_1(1-PER_2) + PER_2(1-PER_1)] + D_{max}*PER_1 PER_2$$

In the above equations, D(b*R) represents a distortion-rate function for a multimedia source, i.e., the distortion that the source incurs after reconstruction at the decoder (due to quantization errors associated with lossy compression by the multimedia codec) as a function of the data rate R determined by the selected MIMO MCS, $D_{max}$ is the maximum possible distortion experienced when the source reconstruction at the decoder is hindered by packet losses and transmission failures, given by $D_{max}=D(R=0)$, and b is a fixed scalar normalization term representing the ratio between the source code rate and channel code rate to account for the rate matching between the multimedia codec and the channel coder. For example, some implementations assume delay-limited multimedia traffic which cannot be buffered due to tight latency constraints. The distortion-rate function D(b*R) is a decreasing function of the data rate R, since a higher source/channel code rate allows for compression with lower quantization errors and hence lower distortion.

Furthermore, it is possible to relate end-to-end distortion to the peak SNR (PSNR) metric using the following relation (for a pixel representation with 8 bits per source sample):

$$PSNR = 10\log_{10}\left(\frac{255^2}{D_{ave}}\right),$$

indicating that distortion minimization is equivalent to PSNR maximization.

Implementations of the distortion-aware MIMO link adaptation criterion allow for realizing the benefits of joint source-channel coding by adapting the channel coding rate to minimize end-to-end distortion, rather than maximize throughput or spectral efficiency. It should be noted that in order to use this distortion-based MIMO link adaptation criterion, only the distortion-rate function D(b*R) may be available at the radio level (which is determined by the nature of the multimedia source as well as the compression capabilities of the codec or source encoder), so this information can be passed from the application layer to the PHY/MAC (physical/media access control) layer. It should be further noted that the above MIMO link adaptation criterion may be employed in conjunction with any distortion-rate function, and that implementations herein also include any method for incorporating distortion criteria in the appropriate selection of a MIMO MCS.

Figure 3:
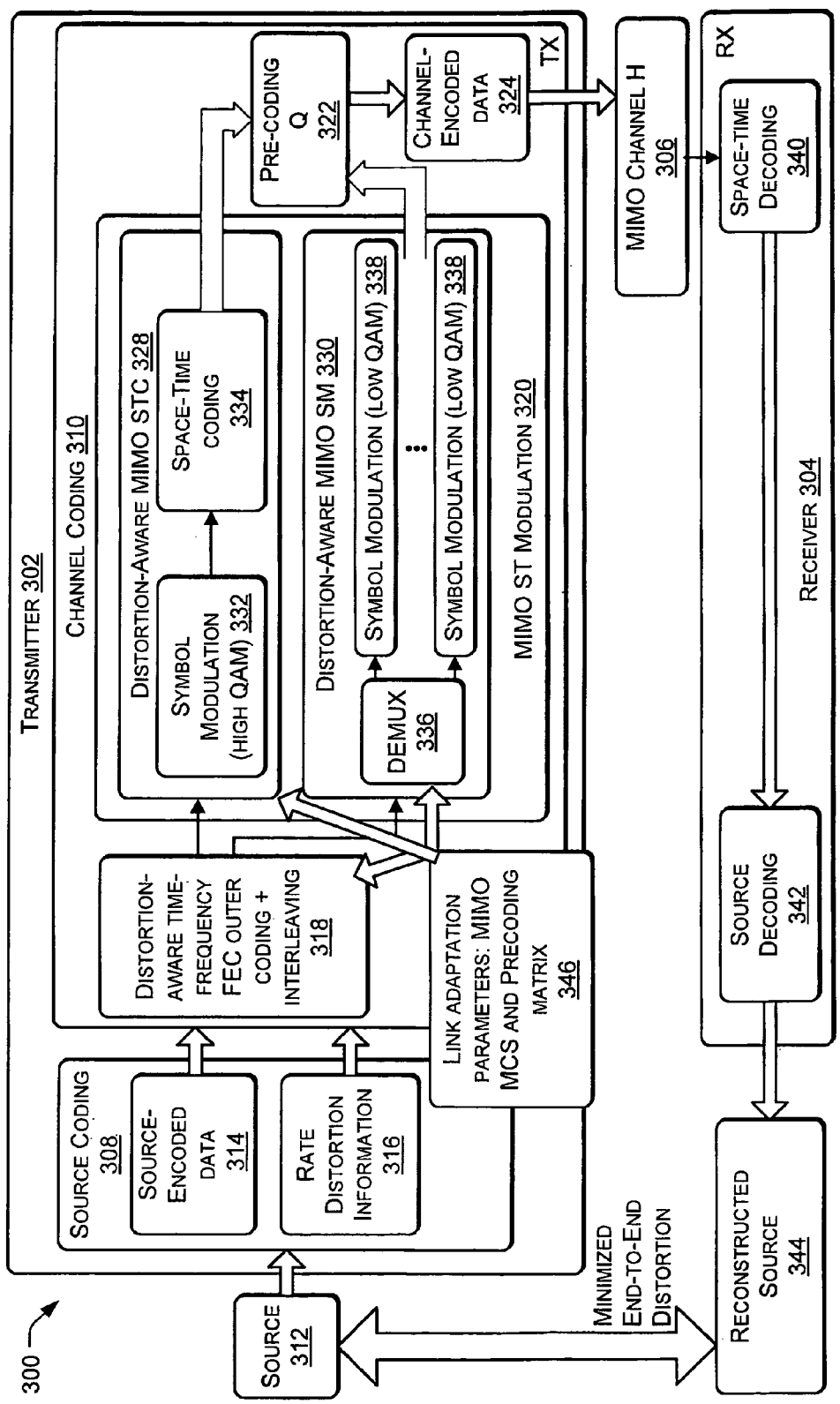
FIG. 3 illustrates a block diagram of an exemplary open loop system according to some implementations.

Implementations of the distortion-aware MIMO link adaptation framework are applicable for both open-loop and closed-loop MIMO systems. The resulting system architectures for the transmitter and receiver components are depicted in FIG. 3 for an open-loop MIMO communication configuration, and in FIG. 4 for a closed-loop MIMO communication configuration with limited rate feedback of link adaptation parameters. The open-loop MIMO setup may be more relevant for scenarios in which reliable estimation and feedback of dynamic channel variations and link adaptation parameters is generally difficult (e.g., as in high mobility scenarios), so the distortion-aware MIMO link adaptation can be performed at the transmitter based on the knowledge of the long-term channel variations and statistics of the instantaneous or short-term channel variations. On the other hand, the closed-loop MIMO setup is more relevant for situations where the channel variations occur over a slower time scale (e.g., as in low-mobility scenarios) to allow for reliable channel estimation and feedback of link adaptation parameters from the receiver to the transmitter (i.e., using mechanisms such as the channel quality indicator (CQI) feedback mechanism), creating the opportunity for performing dynamic link adaptation determination at the receiver based on the knowledge of the instantaneous channel conditions, expressed as:

(MIMO_MCS, $Q$)=$f$(SNR, $H$), where using the function $f$, the receiver maps the instantaneous channel realization H and average SNR to a MIMO-MCS scheme and a precoding matrix Q, and feeds back the information on these selections to the transmitter.

The closed-loop MIMO link adaptation to minimize end-to-end distortion may also be based on statistical or long-term channel knowledge in communication scenarios where link adaptation parameters are determined by the receiver and fed back to the transmitter, for instance, as in the uplink of cellular communications, and at the same time it is difficult to obtain reliable estimates of the instantaneous or short-term channel conditions for various reasons such as high mobility or high user density. In this setup, the receiver performs link adaptation based on the following rule:

(MIMO_MCS, $Q$)=$\hat{f}$(SNR), where using the function $\hat{f}$, the receiver maps the average SNR, which is determined by the knowledge of the long-term channel variations and the statistics of the instantaneous or short-term channel variations, to a MIMO-MCS scheme and a precoding matrix Q, and feeds back the information on these selections to the transmitter.

Open-Loop Architecture

FIG. 3 illustrates a block diagram of an example of an open-loop distortion-aware MIMO link adaptation architecture 300 according to some implementations herein, in which link adaptation parameters are determined and applied at the transmitter. In the architecture of FIG. 3, a transmitter 302 is able to communicate with a receiver 304 via a MIMO channel H 306. In the illustrated implementation, transmitter 302 includes a source encoder, shown as source coding block 308, and a channel encoder, shown as channel coding block 310. The source coding block 308 is configured to compress or otherwise encode a source 312, such as a multimedia source, to create source-encoded data 314, and pass the source-encoded data 314 along with rate-distortion information 316 of the source-encoded data 314 to the channel coding block 310. For example, in the case that source 312 is a video received by source coding block 308 as a stream of video information, source coding block 308 encodes (e.g., compresses) the received stream of video information into a format suitable for transmission (one non-limiting example of a suitable format is the H.264/MPEG-4 AVC video coding standard developed by the ITU-T Video Coding Experts Group (VCEG) together with the ISO/IEC Moving Picture Experts Group (MPEG), finalized May, 2003, or the like). Furthermore, in the case in which the source 312 is an analog stream, source coding block 308 further converts the analog stream into a digital form during encoding.

Consequently, the encoding carried out by the source coding block 308 is at least partially dependent upon the nature of the multimedia source as well as the compression capabilities of the codec or source encoder. Further, according to implementations herein, rate distortion information 316 is determined for the encoded source and this information is also passed to the channel coding block 310 to taken into account for distortion awareness during the channel encoding of the source-encoded data 314. For example, rate distortion characteristics for various codecs and source encoding of various different media types can be determined and/or observed, and passed to the channel coding block 310 by the source coding block 308 based upon the type of source coding used by source coding block 308. The rate-distortion characteristics of the source utilized at the channel coding block 310 for link adaptation purposes may also be dependent on other application and network layer functionalities, such as frame type (e.g., I-frame, P-frame or B-frame), network layer packetization and transmission framework used toward passing the compressed source from the codec to the channel encoder (e.g., in RTP/UDP), type of layering in the case of advanced source compression methods such as scalable video coding (SVC) and application-layer forward error correction FEC (e.g., raptor codes, Reed-Solomon codes, etc.).

The channel coding block 310 includes a time-frequency forward error correction (FEC) outer coding and interleaving block 318, followed by a MIMO space-time (ST) modulation block 320, which is then followed by a MIMO precoding block 322 to produce channel-encoded data 324. Following precoding, the channel-encoded data is transmitted by multi-antenna transmission to the receiver 304 over MIMO channel 306. The MIMO space-time modulation block 320 can either operate in the MIMO diversity mode, as distortion-aware MIMO STC block 328, or in the MIMO spatial multiplexing mode as distortion-aware MIMO SM block 330. In the MIMO diversity mode, output bits of the FEC coding and interleaving block 318 are first modulated by symbol mapping in a symbol modulation block 332 at high quadrature amplitude modulation (QAM), and then re-encoded using a space-time code (STC) into multiple spatial streams at space-time coding block 334. Alternatively, in the MIMO spatial multiplexing mode, the coded/interleaved bits output from the FEC coding and interleaving block 318 are de-multiplexed into multiple spatial streams by a DEMUX block 336, and each stream is then modulated by symbol mapping in a plurality of symbol modulation blocks 338 at low QAM. The decision on whether to use the distortion-aware MIMO STC block 328, or the distortion-aware MIMO SM block 330 is dependent upon the determined distortion-aware criteria for MIMO MCS selection, as discussed herein.

At the receiver end, a space-time decoder block 340 in receiver 304 is configured to recover the transmitted source data from a noisy corrupted received version transmitted over the MIMO wireless channel, following the multi-antenna reception. The recovered data stream is passed to a source decoding block 342, which reconstructs the source with the goal of minimizing the distortion between the original source and a reconstructed source 344. For example, in the case of a multimedia source, such as an audiovisual multimedia content item (e.g., television, movie, video, or the like), the goal is to minimize distortions introduced by the encoding and decoding of the content item and the transmission of the content item over a noisy transmission channel.

The source-encoded data 314 received from the source coding block 308 is passed through the channel encoding blocks 318, 320, 322 before multi-antenna transmission. According to implementations herein, all of these radio-level channel encoder blocks 318, 320, 322 have the property of "distortion-awareness" since these radio-level channel encoder blocks 318, 320, 322 are configured to execute implementations of the distortion-aware MIMO link adaptation strategy for MIMO MCS selection and precoding set forth herein. Based upon formulas (1) and/or (2) and/or (3) link adaptation parameters 346, i.e., MIMO MCS (such as FEC code rate and MIMO space-time modulation scheme) and precoding matrix Q are determined and provided to the radio-level channel encoder blocks 318, 320, 322 for implementing the distortion awareness of these blocks. Examples of how formulas (1)-(3) may be applied based on known channel conditions to determine the link adaptation parameters 346 for the open-loop implementations are described further below.

Closed-Loop Architecture

Figure 4:
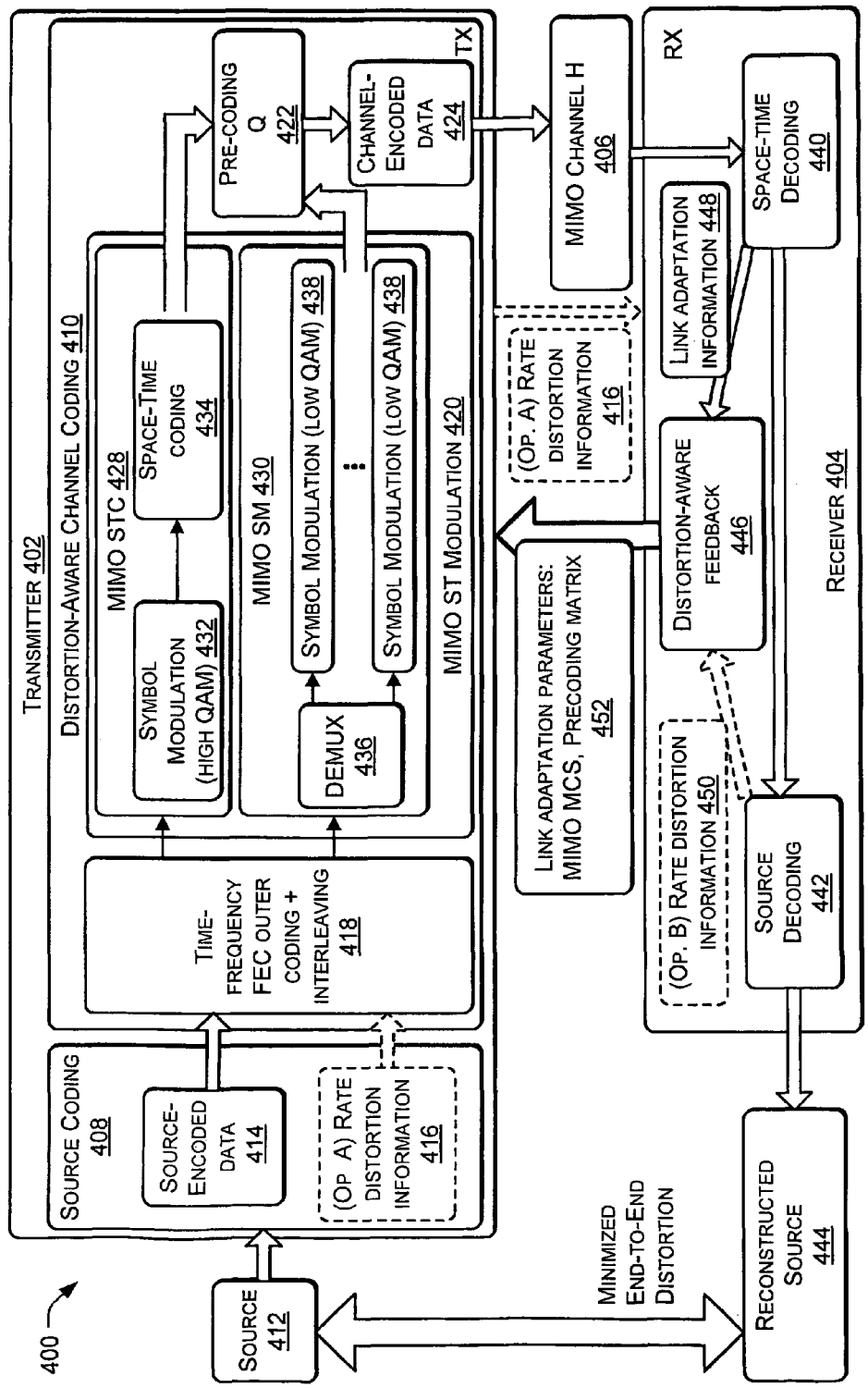
FIG. 4 illustrates a block diagram of an exemplary closed loop system according to some implementations.

FIG. 4 illustrates a block diagram of an example of a closed-loop distortion-aware MIMO link adaptation architecture 400 according to some implementations herein, in which link adaptation parameters are determined at the receiver and are fed back for application at the transmitter. In the architecture of FIG. 4, similar to that of FIG. 3 described above, a transmitter 402 is able to communicate with a receiver 404 via a MIMO channel 406. In the illustrated implementation, transmitter 402 includes a source encoder, shown as source coding block 408, and a channel encoder, shown as distortion-aware channel coding block 410. The source coding block 408 is configured to compress and otherwise encode a source 412, such as a multimedia source, and pass the source-encoded data 414 along with, in some implementations, rate-distortion information 416 of the source-encoded data 414 to the distortion-aware channel coding block 410. However, in other implementations, it may not be necessary for the source coding block 408 to pass rate distortion information 416 to the channel coding block 410. Instead, as discussed further below, the rate distortion information may be determined directly by the receiver 404 and taken into consideration when preparing feedback that is provided to the distortion-aware channel coding block 410. Hence passing the rate distortion information 416 from the source coding block 408 is used in some implementations of the closed loop architecture, and is labeled as Option A (Op. A) in FIG. 4. Alternatively, or in addition, in other implementations, the rate distortion information may be determined independently at the receiver 404, which is labeled as Option B (Op. B) in FIG. 4, and which is discussed additionally below.

The channel coding block 410 includes a time-frequency forward error correction (FEC) outer coding and interleaving block 418, followed by a MIMO space-time (ST) modulation block 420, which is then followed by a MIMO precoding block 422 to produce channel-encoded data 424, which is sent to receiver 404 over MIMO channel 406 (along with rate-distortion information 416 in the case of Op. A). Similar to the configuration discussed above with reference to FIG. 3, the MIMO ST modulation block 420 can either operate in the MIMO diversity mode as MIMO STC block 428, or in the MIMO spatial multiplexing mode as MIMO SM block 430. In the MIMO diversity mode, output bits of the channel coding and interleaving block 418 are first modulated by symbol mapping in a symbol modulation block 432 at high QAM, and then re-encoded using a space-time code (STC) into multiple spatial streams at space-time coding block 434. Alternatively, in the MIMO spatial multiplexing mode, the coded/interleaved bits output from the coding and interleaving block 418 are de-multiplexed into multiple spatial streams by a DEMUX block 436 and each stream is then modulated by symbol mapping in a plurality of symbol modulation blocks 438 at low QAM. The decision on whether to use the MIMO STC block 428, or the MIMO SM block 430 is dependent upon the determined distortion-aware criteria for MIMO MCS selection, which is provided to the distortion-aware channel coding block 410 by feedback from the receiver 404.

At the receiver 404, a space-time decoding block 440 is configured to recover the transmitted source data from a noisy corrupted received version transmitted over the MIMO wireless channel, following the multi-antenna reception. The recovered data stream is passed to a source decoding block 442, which reconstructs the source with the goal of minimizing the distortion between the original source 412 and a reconstructed source 444.

For the closed-loop distortion-aware MIMO link adaptation architecture 400 illustrated in FIG. 4, the receiver 404 also includes, a distortion-aware feedback block 446 that periodically provides feedback to transmitter 402 for enabling the distortion awareness of the distortion-aware channel coding block 410. For example, the distortion-aware feedback block 446 at the receiver 404 may determine from the space-time decoding block 440 link adaptation information 448 (i.e., the estimated MIMO channel parameters, and the MIMO MCS and precoding matrix Q parameters). The distortion-aware feedback block 446 uses the link adaptation information 448 along with rate distortion information 416 (Op. A) and/or rate distortion information 450 (Op. B) to determine distortion-minimizing link adaptation parameters 452, e.g., a MIMO MCS scheme and precoding matrix Q. After the distortion-minimizing MIMO link adaptation parameters 452 have been determined at the receiver 404 based on receiver's knowledge of the long-term channel variations along with the instantaneous or statistical knowledge of short-term MIMO channel realizations, the link adaptation parameters 452 are fed back to the transmitter 402.

In addition, according to some implementations, as discussed above, when determining distortion-minimizing MIMO link adaptation parameters 452, the distortion-aware feedback block 446 may also gather the rate-distortion information 450 about the multimedia source from the source decoding block 442 (Op. B). Alternatively, or in addition, transmitter 402 may send rate-distortion information 416 on the source along with channel-encoded data 424 to receiver 404 over the MIMO channel 406 (Op. A), so that distortion-aware feedback block 446 at receiver 404 may utilize this information in determining distortion-minimizing MIMO link adaptation parameters 452. The rate distortion information 416 and/or 450 are taken into consideration by distortion-aware feedback block 446 when determining the distortion minimizing link adaptation parameters 452, e.g., MIMO MCS and pre-coding matrix, which are then passed to the transmitter 402 through a feedback channel. For example, transmitter 402 may be incorporated into a first device that also includes a receiver (not shown), while receiver 404 may be in the incorporated into a second device that also includes a transmitter (not shown), thus enabling the receiver 404 to provide feedback wirelessly to the transmitter 402 such as over MIMO channel 406, or other wireless channel, link, or the like.

Applications

Implementations herein provide "distortion-awareness" and associated joint source-channel coding ideas to support link adaptation over MIMO systems. All of the MIMO link adaptation blocks at the transmitter and receiver, including MIMO space-time modulation, MIMO precoding, FEC outer coding and interleaving and feedback blocks are impacted and operate differently under implementations of the distortion-aware MIMO link adaptation framework herein. Furthermore, implementations herein may provide distortion-aware MIMO link adaptation techniques that are applicable in conjunction with any of unicast (i.e., one streaming connection established per user), broadcast (i.e., one streaming connection established per service content) and multicast transmission techniques (i.e., one streaming connection established per a selected group of users).

One example of an application according to some implementations of the distortion-aware MIMO link adaptation techniques in this context may be multicast broadcast services (MBS) in the WiMAX 802.16 standard discussed above, also known as multimedia broadcast and multicast services (MBMS) in the standards developed by the Third Generation Partnership Project (3GPP) and BroadCast and MultiCast Service (BCMCS) in standards developed by 3GPP2 (Third Generation Partnership Project 2). For instance, in the context of MBS, conventional link adaptation approaches that aim to maximize goodput typically determine the multimedia transmission rate so that a certain percentage (e.g., 95%) of the users in the network can reliably (e.g., with PER at 1% or lower) receive the multimedia transmission. However, according to some implementations herein, the distortion-aware link adaptation protocols can instead determine the multimedia transmission rate and the associated level of multimedia reception quality (measured in terms of PSNR or average end-to-end distortion) so that a certain percentage (e.g., 95%) of the users in the network can be guaranteed multimedia service with a particular quality of experience (i.e., PSNR or average end-to-end distortion below a predetermined threshold).

Exemplary Open-Loop Process

Figure 5:
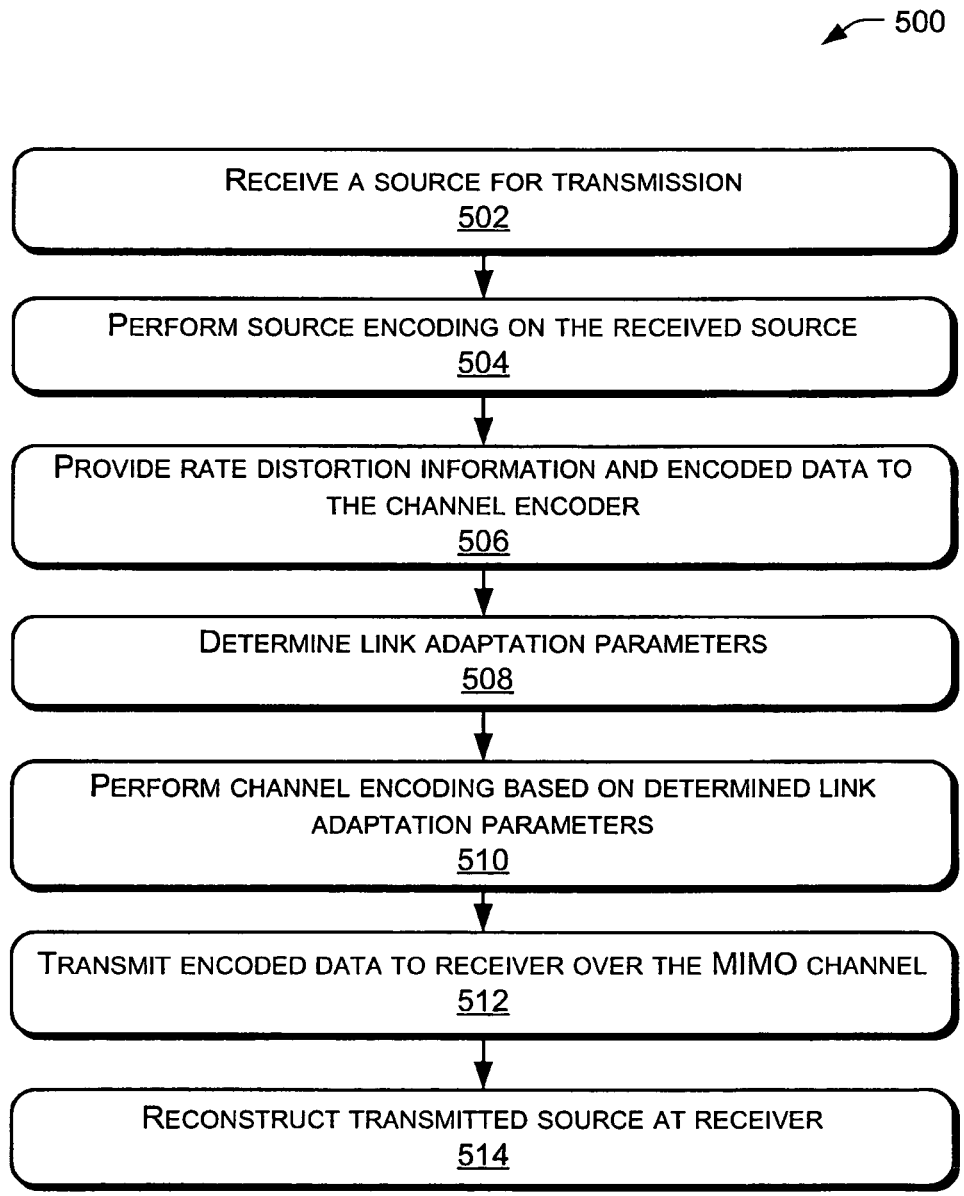
FIG. 5 illustrates a flow diagram of an exemplary process for open-loop distortion-aware communications according to some implementations.

FIG. 5 illustrates a flow diagram of an exemplary open loop process 500 for distortion-aware link adaptation according to some implementations herein. In the flow diagram, the operations are summarized in individual blocks. The operations may be performed in hardware, or as processor-executable instructions (software or firmware) that may be executed by a processor.

At block 502, a source for transmission is provided to a transmitter. For example, as discussed above, the source may be a multimedia communication, including voice over IP, speech and audio communications, mobile TV, mobile video services, or the like.

At block 504, source encoding of the source is performed by a source encoder of the transmitter. For example, as discussed above, the source may be compressed or otherwise encoded in preparation for transmission.

At block 506, the source-encoded data and corresponding rate distortion information are provided to the channel encoder of the transmitter. For example, the rate distortion information may be based upon the type of source encoding performed on the source, and may include known statistical or observed data.

Figure 6:
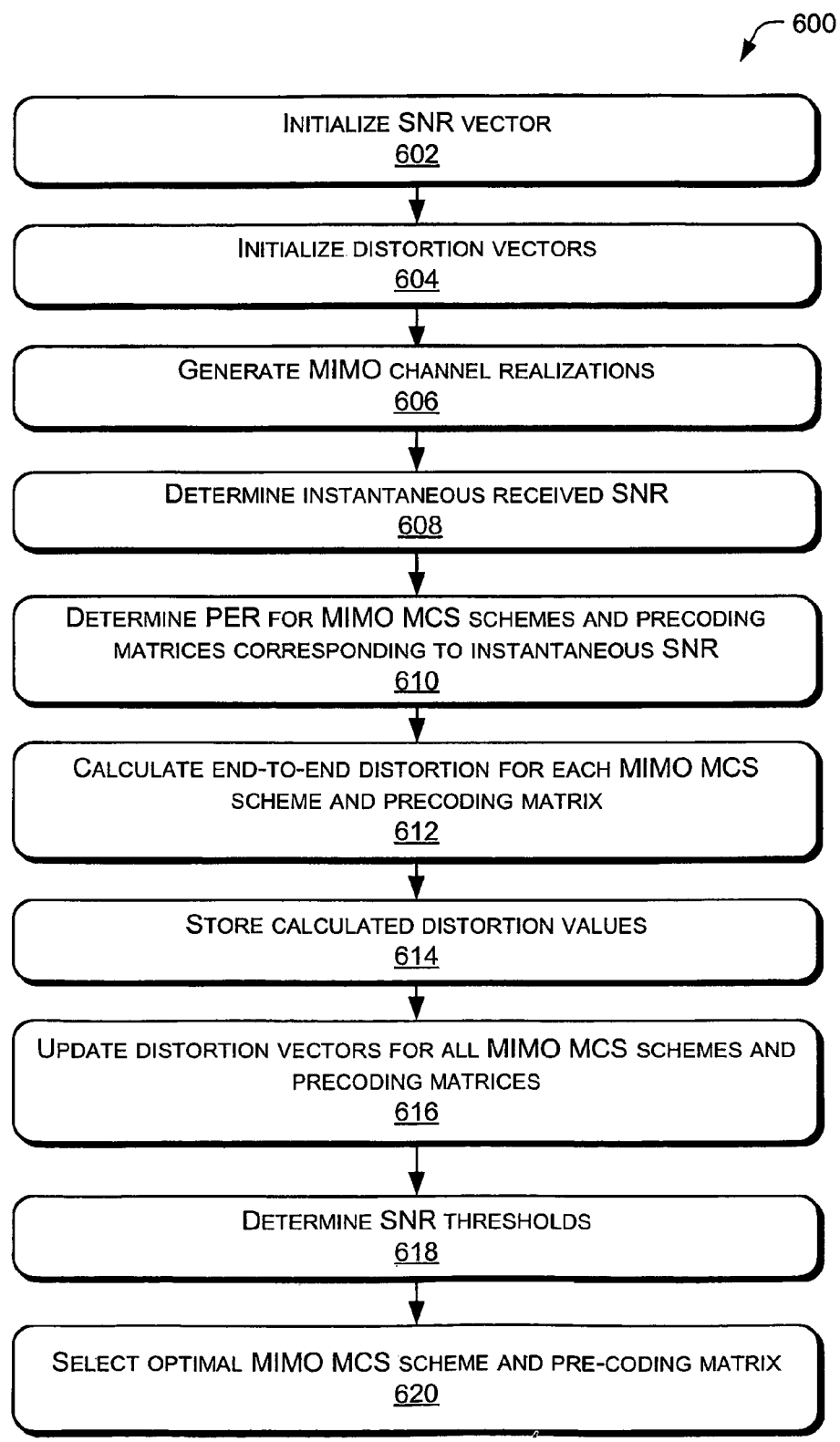
FIG. 6 illustrates a flow diagram of an exemplary process for determining link adaptation parameters according to some implementations.

At block 508, the link adaptation parameters (e.g., the MIMO MCS scheme and precoding matrix) are determined by the distortion-aware channel encoder. For example, link adaptation parameters may include FEC code rate and MIMO space-time modulation for the MIMO MCS scheme and the precoding matrix Q determined based upon the received rate distortion information and statistical information stored at the transmitter for access by the channel encoder. Further, a lookup table or other stored information based upon known statistics (such as SNR values and distortion vectors) of the channel being used may be provided to the channel encoder for determining optimal link adaptation parameters for minimizing end-to-end distortion. FIG. 6 and the corresponding description set forth below provide an example of determining the distortion minimizing link adaptation parameters for open-loop distortion-aware link adaptation according to some implementations herein.

At block 510, channel encoding of the source-encoded data is performed based on the selected link adaptation parameters to produce channel-encoded data.

At block 512, the channel-encoded data is transmitted to the receiver over the MIMO channel.

At block 514, the transmitted encoded data is reconstructed at the receiver to provide a reconstructed source with minimized distortion.

FIG. 6 illustrates a flow diagram of an exemplary process 600 for determining the distortion minimizing parameters for open-loop distortion-aware MIMO link adaptation according to some implementations herein. In the flow diagram, the operations are summarized in individual blocks. The operations may be performed in hardware, or as processor-executable instructions (software or firmware) that may be executed by a processor.

At block 602, the SNR vector is initialized by the channel encoder. For example, each entry is an average received SNR value and represents the long-term channel state information available at the transmitter.

At block 604, distortion vectors are initialized for all MIMO MCS and precoding techniques. For example, the distortion vectors store distortion values (e.g., MIMO MCS and precoding matrix Q) corresponding to the different SNR values. The distortion vector information may be collected statistical and/or observed information corresponding to the SNR values for the intended MIMO channel.

At block 606, for iterations over all the SNR values, and for a large number of iterations over channel realizations, the MIMO channel realization H is randomly generated as described above.

At block 608, the instantaneous received SNR is determined for all MIMO MCS schemes and precoding matrices. For example, the instantaneous received SNR can be determined for Alamouti STC and any other orthogonal space-time block coding (OSTBC), where the instantaneous received SNR is proportional to the squared Frobenius norm of the MIMO channel matrix.

At block 610, the PER (packet error rate) is determined for all MIMO MCS schemes and precoding matrices from instantaneous received SNR. This determination is made by accounting for FEC type and code rates, differences among various MIMO space-time modulations (e.g., STC vs. SM), and also by accounting for orthogonal frequency division multiplexing (OFDM) modulation, and optionally by using PHY abstraction methodologies.

At block 612, for each MIMO MCS and precoding matrix, the end-to-end distortion is calculated using equations (1) and/or (2) and/or (3) set forth above using the PER derived from instantaneous received SNR. For example, as discussed above, equation (1) sets forth the average end-to-end distortion for MIMO diversity mode; equation (2) sets forth the average end-to-end distortion for MIMO SM mode with vertical encoding; and equation (3) sets forth the average end-to-end distortion for MIMO SM mode with horizontal encoding. By applying these equations, average distortion values for MIMO MCS and precoding matrix Q can be determined for the instantaneous received SNR and random channel realization.

At block 614, the calculated distortion values are stored for all MIMO MCS schemes, precoding matrices and random channel realizations.

At block 616, when the large number of iterations over channel realizations has been completed, the distortion vectors are updated for all MIMO MCS schemes and precoding matrices. For example, the entry of each distortion vector corresponding to the particular SNR value is updated with the mean distortion values (i.e., averaged over the random channel realizations).

At block 618, when iterations over all SNRs in the SNR vector have been completed, the SNR thresholds for switching between different MIMO MCS schemes are determined based on the distortion vectors for all MIMO MCS and precoding techniques, so that the average end-to-end distortion can be minimized at any given SNR.

At block 620, the optimal MIMO MCS scheme and precoding matrix Q are selected for channel encoding of the source being transmitted for minimizing the end-to-end distortion.

Exemplary Closed-Loop Process

Figure 7:
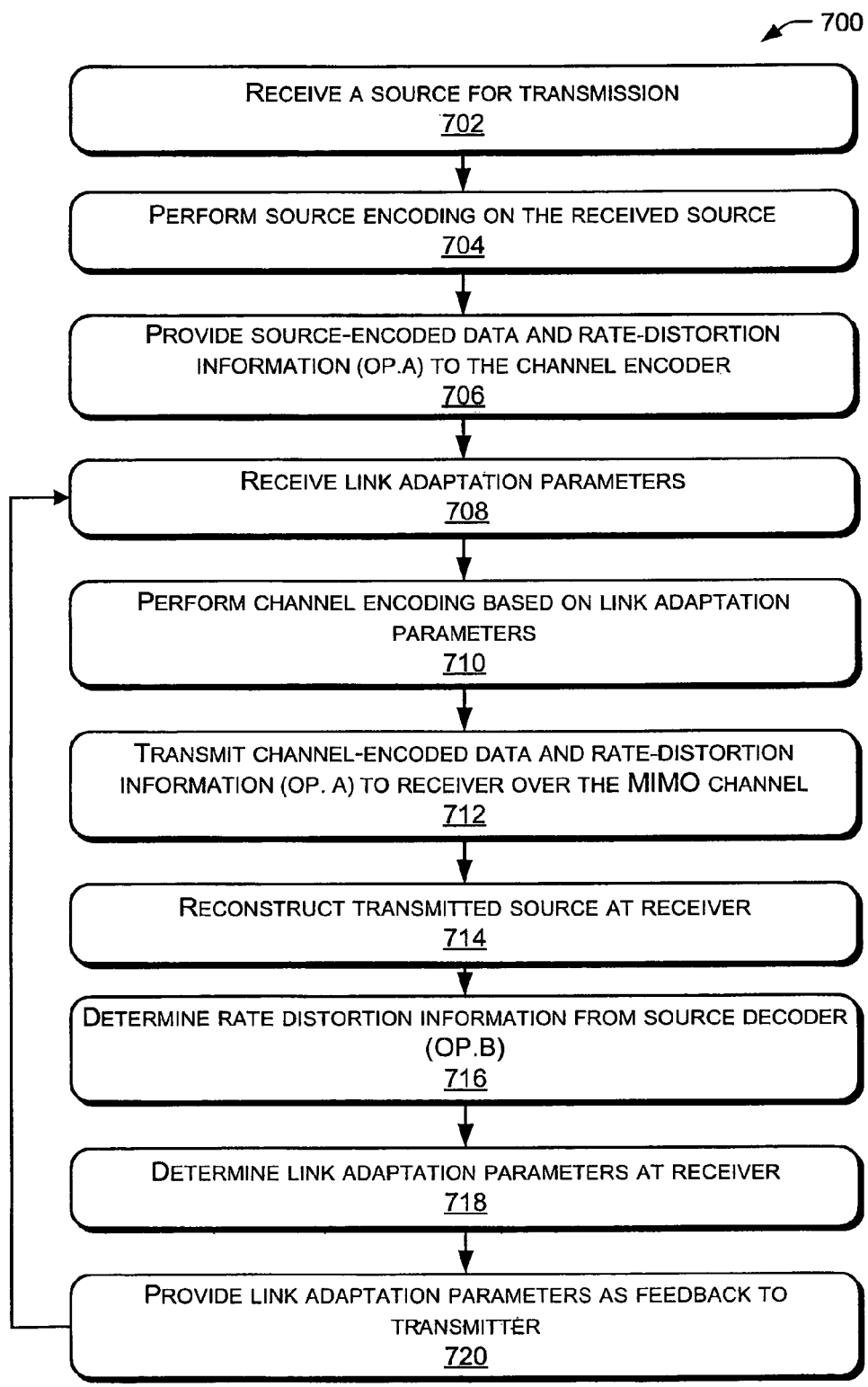
FIG. 7 illustrates a flow diagram of an exemplary process for closed-loop distortion-aware communications according to some implementations.

FIG. 7 illustrates a flow diagram of an exemplary closed-loop process 700 for distortion-aware link adaptation according to some implementations herein. In the flow diagram, the operations are summarized in individual blocks. The operations may be performed in hardware, or as processor-executable instructions (software or firmware) that may be executed by a processor.

At block 702, a source for transmission is provided to the transmitter of the wireless communications device.

At block 704, source encoding of the source data is performed by a source encoder of the transmitter. For example, as discussed above, the source data may be compressed or otherwise encoded in preparation for transmission.

At block 706, the encoded source data (and corresponding rate distortion information in the case of Op. A, as described in FIG. 4) are provided to the channel encoder of the transmitter.

Figure 8:
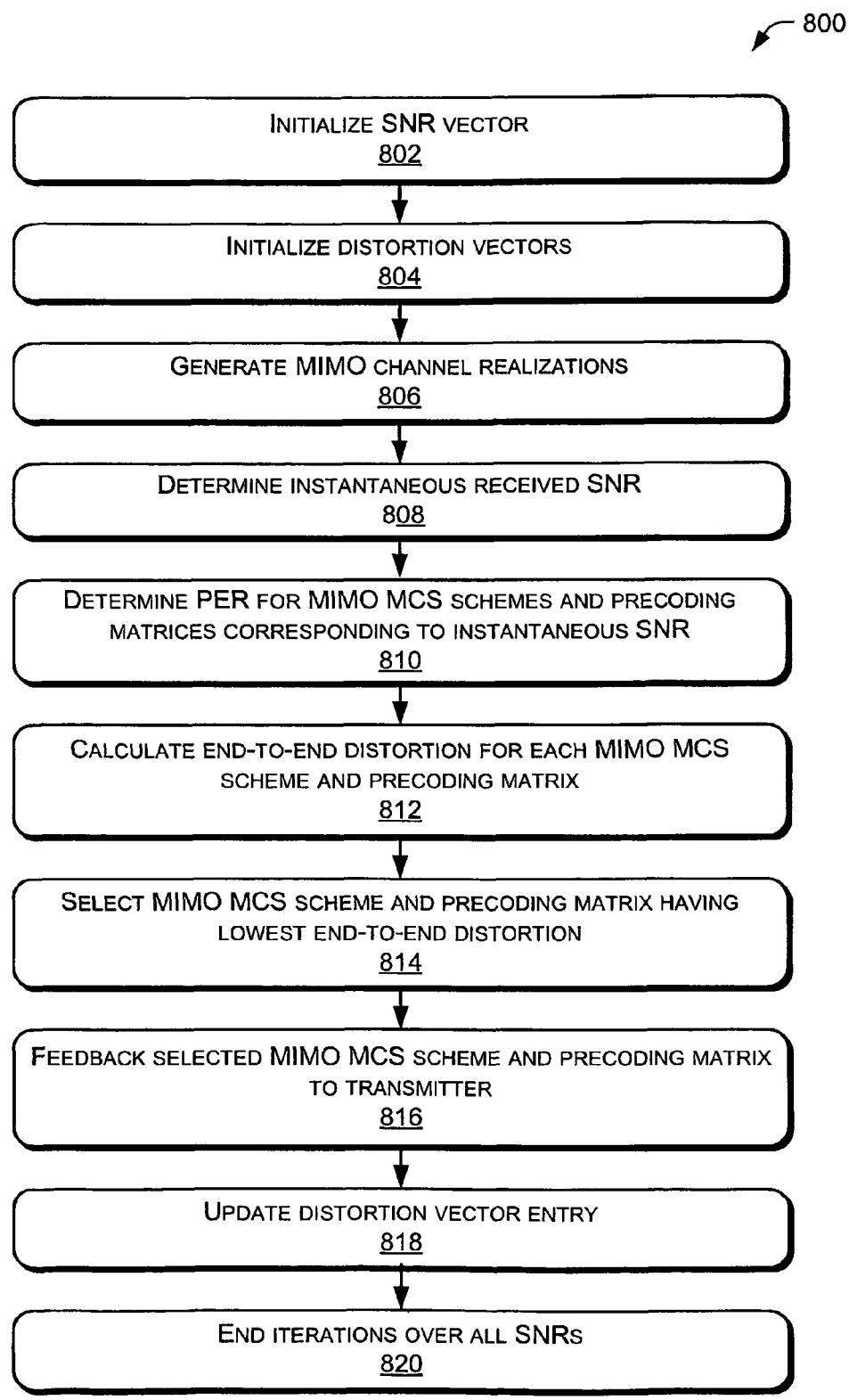
FIG. 8 illustrates a flow diagram of an exemplary process for determining link adaptation parameters according to some implementations.

At block 708, the link adaptation parameters are received by the distortion-aware channel encoder. For example, link adaptation parameters may include a selected MIMO MCS scheme and precoding matrix determined by the receiver and provided as feedback. FIG. 8 and the corresponding description set forth below provide an example of how the receiver determines the distortion minimizing link adaptation parameters for closed-loop distortion-aware link adaptation according to some implementations herein. For example, based on received communications, the receiver can possess reliable and accurate knowledge on the instantaneous or short-term MIMO channel realizations, which holds for typical communication scenarios since the wireless channel variations are slow enough to allow for reliable channel estimation and feedback of link adaptation parameters (e.g., as in low mobility scenarios). Alternatively, FIG. 6 and the corresponding description set forth above may provide another example of how the receiver may determine the distortion minimizing link adaptation parameters for closed-loop distortion-aware link adaptation according to some implementations herein, such as when the receiver cannot reliably estimate the dynamic variations of the MIMO channel (e.g., as in high mobility scenarios), and therefore the distortion-aware MIMO link adaptation at the receiver would be based on the knowledge of the long-term channel variations and the statistical knowledge of the instantaneous or short-term MIMO channel realizations. Thus, in these alternative implementations, the receiver can determine the link adaptation parameters according to the description of FIG. 6 and provide the determined link adaptation parameters as feedback to the transmitter.

At block 710, channel encoding of the source-encoded data is performed based on the MIMO-MCS method selected and the precoding matrix received from the receiver to produce channel-encoded data. Furthermore, if feedback has not yet been received, or if feedback is not received for some other reason, the channel encoder may apply a default MIMO MCS scheme and precoding matrix. Alternatively, the channel encoder may apply the open-loop implementation described above until feedback is received.

At block 712, the channel-encoded data (and rate-distortion information on the source in the case of Op. A, as described in FIG. 4) are transmitted to the receiver over the MIMO channel.

At block 714, the transmitted encoded data is reconstructed at the receiver to provide a reconstructed source.

Block 716, (in the case of Op. B, as described in FIG. 4) a feedback component at the receiver determines the rate distortion information from the source decoder.

At block 718, the feedback component also determines the optimal MIMO MCS scheme and precoding matrix. FIG. 8 provides an example of determining the optimal MIMO MCS scheme and precoding matrix for minimizing overall end-to-end distortion for closed-loop implementations.

At block 720, the link adaptation parameters, e.g., the optimal MIMO MCS scheme and precoding matrix are provided to the transmitter as feedback.

FIG. 8 illustrates a flow diagram of an exemplary process 800 for determining the distortion minimizing parameters for closed-loop distortion-aware link adaptation according to some implementations herein. In the flow diagram, the operations are summarized in individual blocks. The operations may be performed in hardware, or as processor-executable instructions (software or firmware) that can be executed by a processor.

At block 802, the SNR vector is initialized. For example, each entry in the SNR vector is an average received SNR value and represents the long-term channel state information available at the transmitter.

At block 804, the distortion vectors are initialized to store resulting distortion values for all MIMO MCS and precoding techniques after distortion-aware link adaptation at different SNRs.

At block 806, for iteration over all SNRs, and for a large number of iterations over channel realizations, the MIMO channel realization H is randomly generated, as discussed above.

At block 808, the instantaneous received SNR is determined for the MIMO MCS schemes and precoding matrices. For example, the instantaneous received SNR can be determined for Alamouti STC and, any other OSTBC, where the instantaneous received SNR is proportional to the squared Frobenius norm of the MIMO channel matrix.

At block 810, the PER is determined for all MIMO MCS schemes and precoding matrices from instantaneous received SNR. The determination of the PER takes into account FEC type and code rates, differences among various MIMO space-time modulations (e.g., STC vs. SM), and also takes into account OFDM modulation, such as by using PHY abstraction methodologies.

At block 812, For each MIMO MCS and precoding matrix, the end-to-end distortion is calculated using equations (1) and/or (2) and/or (3) using the PER derived from instantaneous received SNR. For example, as discussed above, equation (1) sets forth average end-to-end distortion for MIMO diversity mode; equation (2) sets forth average end-to-end distortion for MIMO SM mode with vertical encoding; and equation (3) sets forth average end-to-end distortion for MIMO SM mode with horizontal encoding. By applying these equations, average distortion values for MIMO MCS and precoding matrix Q can be determined for the instantaneous received SNR and random channel realization.

At block 814, the MIMO MCS scheme and precoding matrix that yields the lowest average end-to-end distortion are selected and the associated distortion value is stored.

At block 816, the information on the selected MIMO MCS scheme and precoding matrix are fed back to the transmitter via the feedback loop.

At block 818, the large number of iterations over channel realizations ends, and the distortion vector is updated. For example, the distortion vector entry corresponding to the particular SNR value is updated with the mean distortion based on the selected MIMO MCS and precoding matrix (i.e., by averaging the distortion values stored during the iteration over the random channel realizations).

At block 820, the iteration over all SNRs in the SNR vector ends.

Exemplary System

Figure 9:
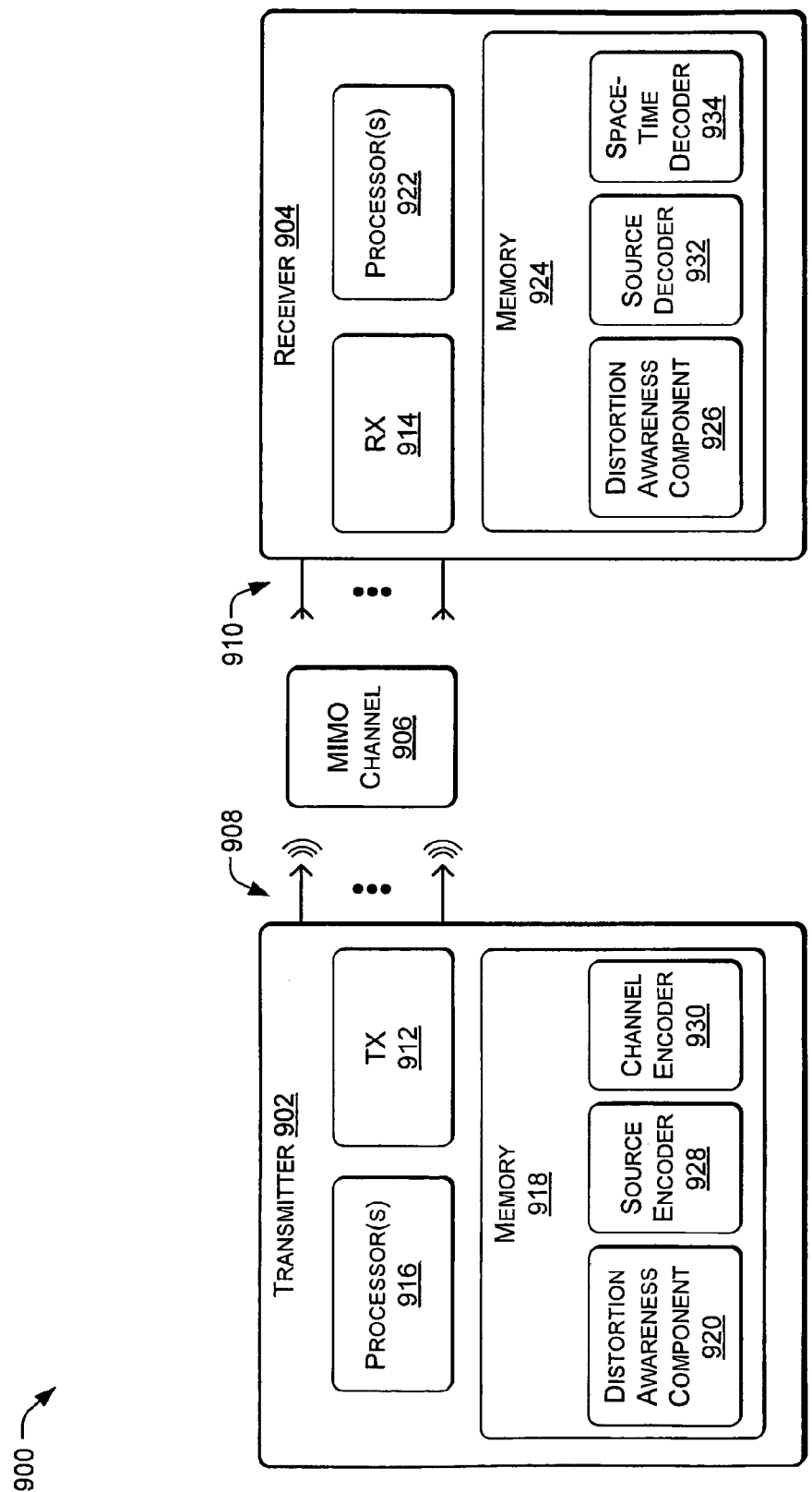
FIG. 9 illustrates a block diagram of an exemplary distortion-aware communication system according to some implementations.

FIG. 9 illustrates an example of a system 900 for minimizing end-to-end distortion using distortion-aware MIMO link adaptation according to some implementations. To this end, the system 900 includes a transmitter 902 configured to communicate wirelessly with a receiver 904 over a MIMO channel 906. Transmitter 902 includes a plurality of transmitter antennas 908 for MIMO communication with a plurality of receiver antennas 910 at receiver 904. Transmitter 902 also includes a transmitter circuit or device 912, such as a radio front end or other wireless transmission mechanism for transmitting signals over the MIMO channel 906. Similarly, receiver 904 may include a receiver circuit or device 914, such as a radio front end or other wireless receiving mechanism for receiving the signals from transmitter 902. In addition, transmitter 902 may include one or more processors 916 coupled to a memory 918 or other processor-readable storage media. For example, memory 918 may contain a distortion awareness component 920 able to be executed by the one or more processors 916 to cause transmitter 902 to carry out the functions described above for minimizing end-to-end distortion. Similarly, receiver 904 may include one or more processors 922 coupled to a memory 924. Memory 924 may contain a distortion awareness component 926 able to be executed by the one or more processors 922 to cause receiver 904 to carry out the functions described above for minimizing end-to-end distortion, such as providing feedback during the closed-loop implementations.

In some implementations, the processor(s) 916, 922 can be a single processing unit or a number of processing units, all of which may include multiple computing units or multiple cores. The processor(s) 916, 922 may be implemented as one or more microprocessors, microcomputers, microcontrollers, digital signal processors, central processing units, state machines, logic circuitries, and/or any devices that manipulate signals based on operational instructions. Among other capabilities, the processors 916, 922 can be configured to fetch and execute processor-executable instructions stored in the memories 918, 924, respectively, or other processor-readable storage media.

The memories 918, 924 can include any processor-readable storage media known in the art including, for example, volatile memory (e.g., RAM) and/or non-volatile memory (e.g., flash, etc.), mass storage devices, such as hard disk drives, solid state drives, removable media, including external drives, removable drives, floppy disks, optical disks, or the like, or any combination thereof. The memories 918, 924 store computer-readable processor-executable program instructions as computer program code that can be executed by the processors 916, 922, respectively, as a particular machine for carrying out the methods and functions described in the implementations herein. Further, memories 918, 924 may also include other program modules stored therein and executable by processor(s) 918, 922, respectively, for carrying out implementations herein, such codecs, or the like. For example, memory 918 may include a source encoder 928 and a channel encoder 930, as discussed above. Similarly, memory 924 may include a source decoder 932 and a space-time decoder 934, as discussed above. Memories 918, 924 may also include data structures, such as stored SNR vectors, lookup tables, MIMO MCS schemes, precoding matrices, and the like (not shown), as discussed above.

Additionally, transmitter 902 and receiver 904 may be implemented in a variety of devices and systems, such as cellular communications systems, Wi-Fi systems, or the like.

For example, transmitter 902 might be incorporated in a mobile computing device, such as a cell phone, smart phone, laptop or the like, while receiver 904 might be implemented in a cell tower, wireless access point, a second computing device, or the like, or vice versa. Further, while exemplary system architectures have been described, it will be appreciated that other implementations are not limited to the particular system architectures described herein. For example the techniques and architectures described herein may in incorporated in any of a variety of wireless communication devices, and implementations herein are not limited to any type of communication devices.

CONCLUSION

Although the subject matter has been described in language specific to structural features and/or methodological acts, it is to be understood that this disclosure is intended to cover any and all adaptations or variations of the disclosed implementations, and that the terms used in the following claims should not be construed to limit this patent to the specific implementations disclosed in the specification. Instead, the scope of this patent is to be determined entirely by the following claims, along with the full range of equivalents to which such claims are entitled.

The invention claimed is:

1. A method comprising:
   selecting one or more parameters for channel encoding of an encoded source for minimizing distortion between the encoded source and a reconstructed encoded source induced by transmission of the source over a multiple input multiple output (MIMO) channel, wherein the one or more parameters selected for minimizing distortion comprises a MIMO modulation and coding scheme (MCS) and a precoding matrix, wherein the MIMO MCS and precoding matrix are selected by:
      randomly generating a plurality of MIMO channel realizations with known statistics;
      determining instantaneous received signal-to-noise ratios for a plurality of MIMO MCS schemes and precoding matrices for the plurality of MIMO channel realizations;
      determining a packet error rate for the plurality of MIMO MCS schemes and precoding matrices;
      calculating average end-to-end distortion values for the MIMO MCS schemes and the precoding matrices based on the packet error rates;
      selecting a MIMO MCS scheme and precoding matrix that minimizes the end-to-end distortion based on the calculated average end-to-end distortion values; and
   performing channel encoding on the encoded source using the selected one or more parameters to provide channel-encoded data for transmitting the encoded source over the MIMO channel;
   performing source encoding on the source with a source encoder prior to the channel encoding;
   receiving rate distortion information from the source encoder, wherein the rate distortion information is used for selecting the one or more parameters for minimizing the distortion, wherein the receiving is performed at a channel encoder.

2. The method according to claim 1, further comprising:
   selecting the one or more parameters based on a determined minimum average end-to-end distortion,
   wherein the minimum average end-to-end distortion is determined as a function of packet error rate for the MIMO channel.

3. The method according to claim 1, wherein selection of the MIMO modulation and coding scheme further comprises at least one of:
   selection of the modulation order;
   selection of the forward error correction type and coding rate; or
   determination of space-time modulation techniques to be used.

4. The method according to claim 1, wherein selecting the precoding matrix further comprises at least one of:
   beamforming to convert a MIMO channel into an equivalent single-input single-output channel;
   precoded spatial multiplexing;
   precoded orthogonal space-time block coding;
   transmit power allocation and covariance optimization; or
   transmit antenna selection techniques.

5. The method according to claim 1,
   wherein the one or more parameters are MIMO link adaptation parameters received by a transmitter performing the channel encoding as feedback from a receiver receiving data from the transmitter;
   wherein the receiver determines the one or more parameters based upon the data received from the transmitter.

6. The method according to claim 5,
   wherein the receiver determines the one or more parameters based at least in part on rate distortion information;
   wherein the rate distortion information is determined at the receiver or sent by the transmitter to the receiver.

7. At least one non-transitory computer accessible medium for carrying out the method according to claim 1.

8. A system comprising:
   a transmitter having a processor for implementing a channel encoder configured to encode an encoded source for transmission over a multiple input multiple output (MIMO) channel, further configured to receive rate distortion information from a source encoder, wherein the rate distortion information is used for selecting one or more parameters for minimizing the distortion,
   wherein the channel encoder encodes the encoded source using a MIMO modulation and coding scheme (MCS) and a precoding matrix selected to minimize distortion between the encoded source and a reconstructed encoded source due to transmission over the MIMO channel, wherein the MIMO MCS and precoding matrix are selected by:
      randomly generating a plurality of MIMO channel realizations with known statistics;
      determining instantaneous received signal-to-noise ratios for a plurality of MIMO MCS schemes and precoding matrices for the MIMO channel realizations;
      determining a packet error rate for the plurality of MIMO MCS schemes and precoding matrices;
      calculating average end-to-end distortion values for the plurality of MIMO MCS schemes and the precoding matrices based on the packet error rates;
      selecting a MIMO MCS scheme and precoding matrix that minimizes the end-to-end distortion based on the calculated average end-to-end distortion values.

9. The system according to claim 8,
   wherein the selection of the MIMO MCS and precoding matrix is performed by a receiver in communication with the transmitter,
   wherein the transmitter receives the selected MIMO MCS and precoding matrix from the receiver.

10. The system according to claim 8, wherein the channel encoder selects the MIMO MCS and precoding matrix to minimize distortion based upon at least one of instantaneously determined channel conditions or statistically known channel conditions.

11. The system according to claim 8,
wherein the source is a continuous multimedia source to be transmitted to a receiver to provide the reconstructed encoded source at the receiver,
wherein the MIMO MCS and precoding matrix selected to minimize distortion are selected based on a determined average end-to-end distortion between the source and the reconstructed source,
wherein the average end-to-end distortion is determined based at least in part upon a calculated packet error rate for the MIMO channel.

12. The system according to claim 8,
wherein the transmitter further comprises a source encoder for encoding the source prior to encoding by the channel encoder, wherein the source encoder provides rate distortion information to the channel encoder for use by the channel encoder in selecting the MIMO MCS and precoding matrix.

13. At least one non-transitory computer accessible medium for implementing a method comprising:
determining a link adaption configuration for transmitting an encoded source over a multiple input multiple output (MIMO) channel, wherein the link adaptation configuration is determined based on a calculated rate distortion between the encoded source and a transmitted reconstructed encoded source, wherein the link adaptation configuration comprises a selected MIMO modulation and coding scheme (MCS) and precoding matrix, wherein the selected MIMO MCS and precoding matrix are selected to minimize the distortion between the encoded source and the transmitted reconstructed encoded source, and wherein the MIMO MCS and precoding matrix are selected by:
randomly generating a plurality of MIMO channel realizations with known statistics;
determining instantaneous received signal-to-noise ratios for a plurality of MIMO MCS schemes and precoding matrices for the MIMO channel realizations;
determining a packet error rate for the plurality of MIMO MCS schemes and precoding matrices;
calculating average end-to-end distortion values for the MIMO MCS schemes and the precoding matrices based on the packet error rates;
selecting a MIMO MCS scheme and precoding matrix that minimizes the end-to-end distortion based on the calculated average end-to-end distortion values; and
receiving the rate distortion information at a channel encoder from a source encoder, wherein the rate distortion information is used for selecting one or more parameters for minimizing the distortion.

14. The computer accessible medium according to claim 13, wherein the link adaption configuration determined based on the calculated distortion specifies whether the encoded source is to be transmitted using MIMO space-time coding in the channel encoder or MIMO spatial multiplexing in the channel encoder.

15. The computer accessible medium according to claim 13, wherein the link adaption configuration determined based on the calculated distortion specifies selection of a forward error correction type and a code rate.

* * * * *